Jan. 30, 1945. S. W. DAMIAN 2,368,117

SAFETY GLASSES

Filed April 10, 1942 2 Sheets-Sheet 1

INVENTOR
SAMUEL W. DAMIAN
by
John E. Jackson
his Attorney

Jan. 30, 1945.  S. W. DAMIAN  2,368,117
SAFETY GLASSES
Filed April 10, 1942  2 Sheets-Sheet 2
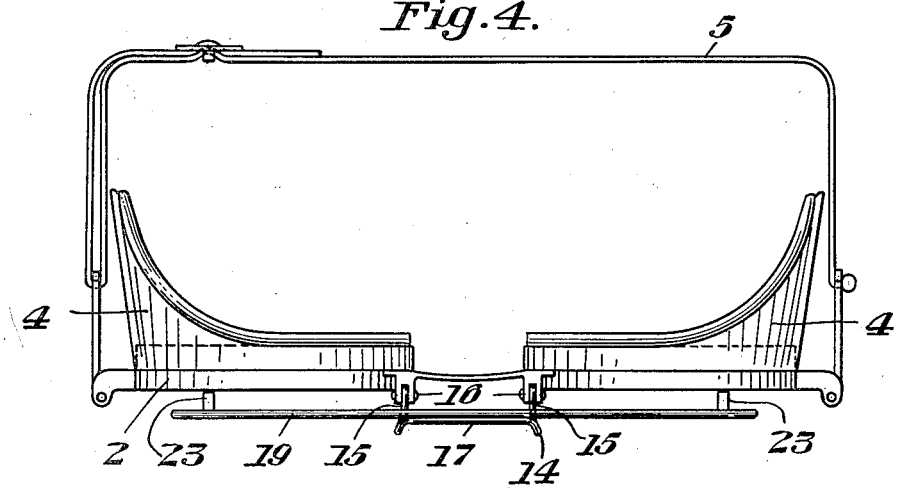
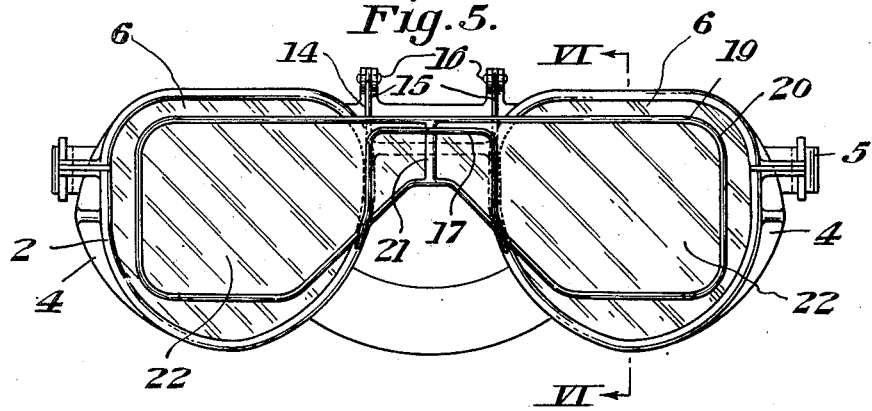
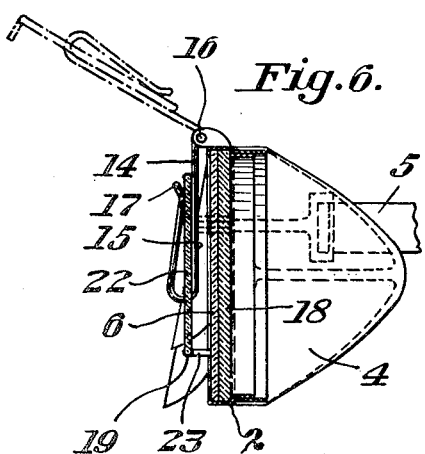
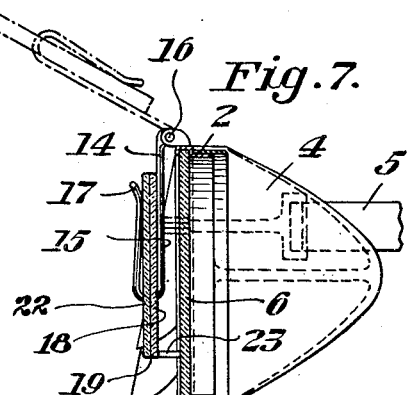
INVENTOR
SAMUEL W. DAMIAN
by John E. Jackson
his Attorney Patented Jan. 30, 1945

2,368,117

UNITED STATES PATENT OFFICE 2,368,117

SAFETY GLASSES

Samuel W. Damian, Duquesne, Pa.

Application April 10, 1942, Serial No. 438,485

5 Claims. (Cl. 88—41)

This invention relates to safety glasses or goggles and particularly to an improvement in safety glasses for protection against both foreign particles and injurious light rays.

It is common practice to use safety goggles or glasses having shatter-proof glass lenses. Also, colored glass lenses are commonly used for protection against light rays. At times it is necessary to use both types of glasses, particularly in certain industries such as the steel industry, but certain conditions prevent their prolonged use together. For example, men working in the steel mills in the vicinity of molten metal, hot furnaces and the like may require continuous protection for the eyes against heat, flying particles, etc., but infrequently need protection against light rays. Further, said workmen must have clear vision the greater portion of the time, and cannot, therefore, be hampered by an extra pair of colored glasses such as are commonly employed for protection against light rays.

In the steel industry it is necessary for the operator of a furnace, such as an open hearth furnace to inspect the furnace interior and to estimate its temperature and the temperature of the molten metal therein, or to make other necessary observations. It is usually the practice to employ cobalt blue glasses or other suitable types of colored glasses for such purpose. Such operators and workmen attempt protection against injurious light rays from the furnace by holding the colored glasses before their eyes when viewing the interior of the furnace and the molten metal therein, the degree of protection thereby being dependent upon the workman's diligence in procuring and holding the glasses. However, when the operator or workman must use his hands under such practices, eye protection is sacrificed or is entirely forgotten. Also, workmen may unintentionally become subject to injurious light rays with resulting injury to the eyes.

Accordingly, it is one of the objects of the present invention to provide improved safety glasses or goggles having safety glass lenses incorporated therewith for protecting the eyes from mechanical injury and also lenses for protecting the eyes from light rays whereby eyes of the user will be protected both from injury from flying particles and from injury from intense light rays.

It is another object of the invention to provide improved safety glasses having light ray protecting lenses incorporated therewith which can be readily and conveniently adjusted to position for clear vision or which can be adjusted so that the light ray protecting lenses are in an eye protective position.

It is a further object of this invention to provide improved safety glasses having light ray protecting lenses incorporated therewith which are strong and rugged in their construction, and at the same time, effective and efficient in their use.

It is a more specific object of the present invention to provide improved safety glasses or goggles having polarizing glass lenses incorporated therewith which may be adjusted to position so as to provide for a clear vision or to position so as to obtain a polarized effect.

Various other objects and advantages of my invention will become more apparent during the course of the following specification and will be particularly pointed out in the appended claims.

In the accompanying drawings there are shown, for purpose of illustration, several embodiments which my invention may assume in practice.

In the drawings:

Fig. 4 is a top view similar to Fig. 1 showing a modified construction of my improved safety glasses;

Fig. 5 is a front elevation thereof;

Fig. 6 is a section taken on line VI—VI of Fig. 5; and

Fig. 7 is a vertical section similar to Fig. 6 showing another modified construction of the improved safety glasses of my invention.

Figure 1:
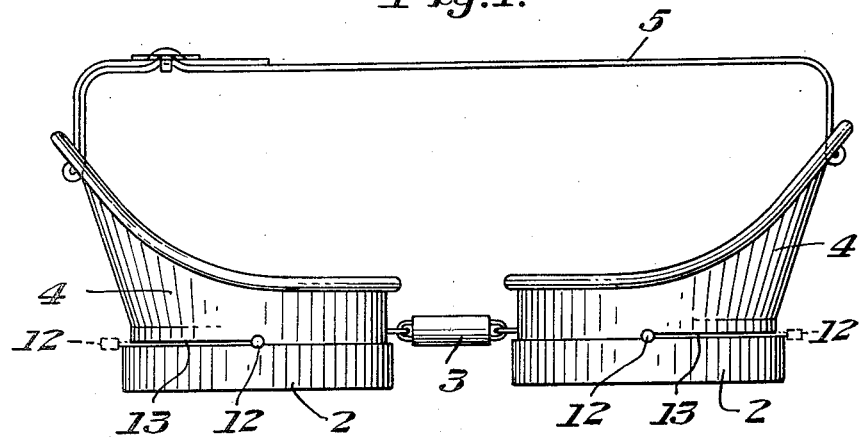
Fig. 1 is a top view of the improved safety glasses or goggles of my invention.

Referring more particularly to the drawings the improvement of my invention is shown incorporated with a conventional type pair of safety glasses or goggles which comprises a frame 2 having a nosepiece or bridge 3. There is provided preferably side guards 4 and there is attached to these guards preferably a resilient strap 5 which is adapted to fit around the head of the wearer for the purpose of holding the glasses or goggles in position on the head. There is arranged within the frame 2, a pair of lenses 6, preferably made of shatter-proof glass.

Figure 2:
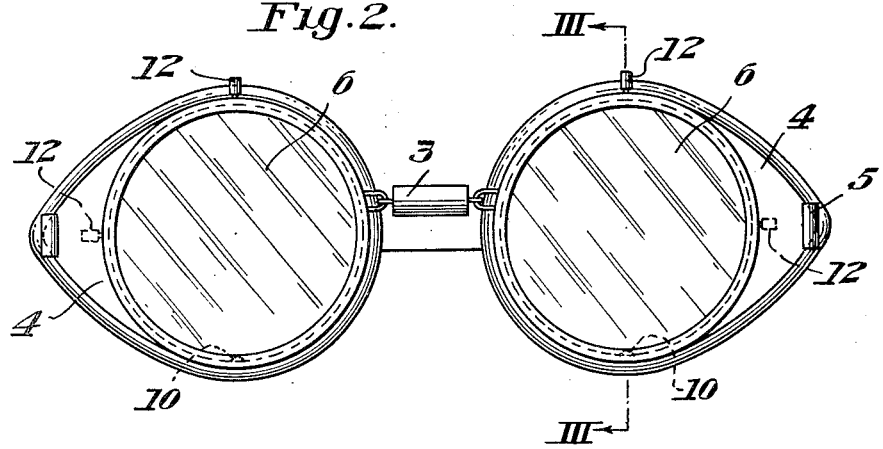
Fig. 2 is a front elevation thereof.
Figure 3:
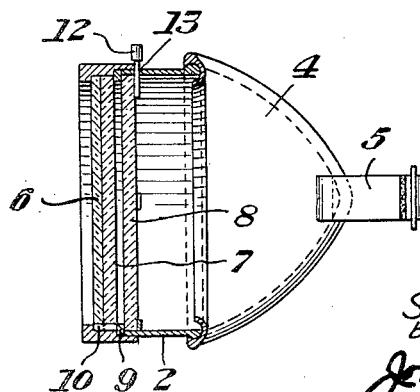
Fig. 3 is a section taken on line III—III of Fig. 2.

According to the preferred embodiment of the present invention as shown in Figs. 1 to 3 of the drawings, there is arranged to one side of each lens of the pair of safety glass lenses 6, preferably on the inner side thereof, a pair of polarizing glass lenses 7 and 8. The polarizing lens 7, sometimes called the polarizer, is positioned preferably directly next to the glass lens 6 and the other polarizing lens 8, sometimes called the analyzer, is positioned on the inner side of the polarizing lens 7 and is preferably spaced therefrom by means of an annular member or spacing ring 9. The polarizing lens 8 is preferably circular in shape and movably mounted in suitable guideways in the frame 2 for a limited oscillating movement therein for a purpose hereinafter to be described.

There is carried by the frame 2 preferably at the lower side of each lens of the pair of lenses, a projecting portion 10 which is adapted to fit into and cooperate with a notch arranged in the lower side of both the safety glass lens 6 and the polarizing lens 7 so as to maintain these lenses in position in the frame and to prevent movement of these lenses relative thereto.

On each of the movable polarizing lenses or analyzers 8 there is arranged a radially extending finger-like portion or knob 12 which extends outwardly and beyond the periphery of the lenses. In the outer top side of the frame 2 directly opposite each of the polarizing lenses 8 there is arranged preferably a slotted opening 13 through which the respective finger-like portion or knob 12 carried by the polarizing lenses 8 extends. The slotted openings 13 extend preferably through an arc of 90° around the periphery of the frame and the arc of rotation or the oscillating movement of the lenses 8 is limited by the length of the slotted opening.

Polaroid glasses are now in common use and the manner in which they subdue light rays is well known and any extensive discussion of their operation is deemed unnecessary. It is sufficient to say that plane polarized light is light in which all the vibrations are in parallel planes, at right angles to the medium of polarization.

The improved safety goggles or glasses of my invention are used in the following manner.

There is provided in my glasses a pair of polarizing lenses with one lens called the polarizer and the other lens the analyzer. When the plane surfaces of the polarizer and the analyzer are superimposed on one another with their polarizing axes parallel, ordinary light will pass through both the polarizer and the analyzer without sensible loss, but when the analyzer is rotated through an angle of 90° or to a crossed position relative to the polarizer the transmission of ordinary light through the lenses is almost completely eliminated. It has been found that due to the high radiation and energy emitted by such sources of heating as the bath of an open hearth or electric furnace, or an electric arc or gas welder, the amount of light which passes through the lenses in crossed position is sufficient to make the necessary observations thereof.

In the present invention when the polarizing lens or analyzer 8 is positioned so that the vibrations are in parallel planes, that is with the finger-like portions or knobs 12 positioned at the top of the frame as shown in the full lines of Figs. 1 to 3 of the drawings, ordinary light will pass through the lenses of the safety glasses and a clear vision may be had therethrough. This is the position that the lenses will assume when the wearer of the glasses is doing ordinary work and work which requires a clear vision. When it is desired to observe the molten metal in the interior of the furnace or some other intense source of light each of the polarizing lenses or analyzers 8 is rotated through 90° by manipulating the finger-like portions or knobs 12 carried thereby so that the finger-like portions 12 will be positioned at the outer sides of their respective lenses as shown in the broken lines of Figs. 1 and 2 of the drawings. In such position the vibrations passing through the polarizing lens 7 will be at right angles to the vibrations passing through the polarizing lens or polarizer 8, thereby preventing ordinary light from passing therethrough. However, as has been heretofore explained the wearer may observe the molten metal bath in a furnace due to the intensity thereof. After the source of light has been observed and it is again desired to obtain a clear vision through the glasses the finger-like portions 12 are manipulated so as to rotate the polarizing lenses or analyzers 8 through 90° so that the finger-like portions or knobs 12 are again positioned at the top of the frame.

In Figs. 4, 5 and 6 of the drawings there is shown a modified construction of the improved safety glasses or goggles of my invention. In this construction there is provided a mounting clip 14 which is preferably formed of spring wire and bent substantially U-shaped so as to provide spaced arm-like portions 15 which are hinged at their ends to the top of the frame 2 as at 16. Intermediate the length of the clip 14, there is provided a hook-like portion 17 which is formed by bending the U-shaped wire upon itself and which is spaced from the arm-like portions 15 so as to provide a spring clip member. As in the preferred embodiment of my invention there is arranged to one side (preferably on the inner side) of each lens of the safety glass lenses 6 a polarizing glass lens or polarizer 18. There is removably mounted in the clip 14 a second pair of glasses 19 which consists of a frame 20 having a tiepiece 21 at the bridge portion thereof.

The clip 14 grips the second pair of glasses 19 at the tiepiece 21 so as to securely hold the same therein. There is positioned in the frame 20 a pair of polarizing glass lenses or analyzers 22 with the polarizing plane arranged at 90° or in crossed position to that of the polarizing lens or polarizer 18 arranged in the frame 2.

It will be understood that in this construction if a clear vision is desired the spring clip 14 together with the second pair of glasses containing the polarizing lenses or analyzers 22 is moved about its pivotal connection at 16 to a raised position as shown in the broken lines of Fig. 6 of the drawings. When it is desired to observe the molten bath or another intense source of light, the clip 14 in which the second pair of glasses 19 is mounted is moved about its pivotal connection 16 so that the polarizing lenses or analyzers 22 carried thereby are disposed opposite the safety glass lenses 6 and the polarizers 18 arranged in the frame 2. There is carried by the frame 20 of the second pair of glasses 19, preferably at the lower side thereof, an inwardly extending projecting portion 23 which is adapted to act as a stop and to abut against the outer side of the shatterproof glass lenses 6 when the hinged clip 14 together with the second pair of glasses 19 is moved to position opposite the safety glass lenses 6 as shown in the full lines of Fig. 6.

In Fig. 7 there is shown another modification of my invention which is similar to that shown in Figs. 4, 5 and 6 of the drawings. In this construction both of the polarizing glass lenses, that is the polarizing lenses 18 and the polarizing lenses or analyzers 22 are mounted in the frame 20 of the second pair of glasses 19. The polarizing lenses are disposed directly next to each other in a superimposed position with the one of the polarizing lenses or the analyzers 22 arranged so that the vibrations of light will be disposed substantially at right angles to the vibrations of light through the other polarizing lenses or polarizers 18. In the main frame 2 of the pair of glasses there is mounted only the pair of safety glass lenses 6. The glasses of this construction are used in a manner similar to the glasses hereinbefore described and shown in Figs. 4, 5 and 6 of the drawings. When the wearer of the glasses desires a clear vision the clip in which the second pair of glasses 19 together with both sets of the polarizing lenses 18 and 22 is mounted is moved about its pivoted connection 16 to a raised position above the main frame of the glasses as shown in the broken lines of Fig. 7. As before when it is desired to view an intense source of light, the clip together with the pair of glasses 19 carried thereby is moved downwardly about the pivotal connection 16 so that both the polarizing lenses are disposed directly opposite the safety glass lenses 6 in the frame 2 with the stop portions 23 carried by the frame 20 abutting against the outer side of the lenses 6 as shown in the full lines of Fig. 7.

It is a well known fact that workmen in the vicinity of open hearth furnaces neglect to wear or oftentimes intentionally fail to wear ordinary safety goggles except when observing the interior of or when feeding materials into the furnace. This is for the reason that furnace heat flashes and glare irritate the eyes similarly to that experienced in night driving against bright head lights of an approaching automobile. This effect is actually greater with the conventional safety goggles than without them. Without protection the workman's eyes suffer from flashes as well as direct radiation when in close proximity to the furnace opening. Even when cobalt blue glasses are used the eyes are not protected from reflected side flashes and radiation since such glasses protect only the focal region of the eyes.

As a result of my invention it will be seen that all of these objectionable features have been overcome and eliminated by the use of polarizing glass lenses incorporated with glasses of the goggle type. With the use of the improved safety glasses of my invention it will be seen that vision is clear when desired and that the eyes are protected from flashes of light. It will be seen that my improved glasses can be easily and conveniently adjusted for any degree of light, thereby inducing continuous use of the goggles by workmen.

When the glasses of the present invention are worn by a furnace operator, it will be understood that the temperature of the furnace and metal bath can be observed by positioning the analyzers in their crossed position or at right angles to the polarizers so as to provide polarized light through the glasses. With the analyzers in such position the whiteness indicating high temperature in the furnace is transmitted through the polarizing lenses so that the temperature of the roof, flame or bath may be readily compared as the intensity of radiation is reduced by polarization, whereas in cobalt blue glasses the intensity is reduced by color absorption.

The polarizing glass lenses in the safety glasses of my invention may be tinted if desired. The tinting of the polarizing lenses, i. e. the polarizers and/or the analyzers, can be ascertained by experiment so that when the polarizing lenses are in a crossed position the amount of color absorption provides substantially the same result as that in judging temperatures by use of cobalt blue glasses to which the operator or wearer is accustomed.

While I have shown and described several specific embodiments of my invention, it will be understood that these embodiments are merely for the purpose of illustration and description and that various other forms may be devised within the scope of my invention, as defined in the appended claims.

I claim:

1. In a pair of safety glasses for judging the temperature in metallurgical furnaces and the like, a frame consisting of two eye units with a bridge connecting the same, each eye unit having a clear glass safety lens fixedly mounted therein, a polarizing lens arranged at one side of each of said safety lenses and another polarizing lens positioned opposite each of said eye units and mounted for movement relative to the safety lens therein, at least one polarizing lens of each of said eye units being tinted so as to provide safety glasses possessing substantially the same protective characteristics and color absorption qualities as obtained by the combined use of ordinary safety glasses and cobalt blue glasses when the polarizing lenses of said units are in crossed position.

2. In a pair of safety glasses for judging the temperature in metallurgical furnaces and the like, as defined in claim 1, including a fingerlike portion extending outwardly from the periphery of the movable polarizing lens for manipulating the same whereby said lens may be rotated and adjusted relative to the other polarizing lens.

3. In a pair of safety glasses for judging the temperature in metallurgical furnaces and the like, a frame consisting of two eye units with a bridge connecting the same, each eye unit having a clear glass safety lens fixedly mounted therein, a polarizing lens fixedly mounted in each of said eye units rearwardly of and directly next to the safety lens therein, and another polarizing lens positioned opposite each of said eye units and mounted for movement relative to both the safety lens and the fixedly mounted polarizing lens therein, at least one of the polarizing lenses of each of said eye units being tinted so as to provide safety glasses possessing substantially the same protective characteristics and color absorption qualities as obtained by the combined use of ordinary safety glasses and cobalt blue glasses when the polarizing lenses of said units are in crossed position.

4. In a pair of safety glasses for judging the temperature in metallurgical furnaces and the like, as defined in claim 3, including means for rotating the movable polarizing lens relative to both the fixedly mounted safety lens and polarizing lens whereby said movable lens may be adjusted relative to the fixedly mounted polarizing lens.

5. In a pair of safety glasses for judging the temperature in metallurgical furnaces and the like, a frame consisting of two eye units with a bridge connecting the same, a polarizing lens mounted in each of said eye units, a second polarizing lens positioned opposite each of said first-mentioned polarizing lenses and mounted for movement relative thereto to bring the axes thereof into crossed position, at least one of the polarizing lenses of said eye units being tinted so as to provide safety glasses which may be continuously worn as safety glasses when said polarizing lenses are not in crossed position and which possess substantially the same color absorption qualities as cobalt blue glasses when the polarizing lenses of said units are in crossed position.

SAMUEL W. DAMIAN.